United States Patent
Mizobuchi et al.

(10) Patent No.: US 9,106,885 B2
(45) Date of Patent: Aug. 11, 2015

(54) RECORDING/REPRODUCTION DEVICE, RECORDING/REPRODUCTION METHOD, TELEVISION RECEIVER, PROGRAM, AND RECORDING MEDIUM

(75) Inventors: Ichiro Mizobuchi, Osaka (JP); Akira Koike, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 155 days.

(21) Appl. No.: 13/882,798

(22) PCT Filed: Apr. 2, 2012

(86) PCT No.: PCT/JP2012/059006
§ 371 (c)(1),
(2), (4) Date: May 1, 2013

(87) PCT Pub. No.: WO2013/008495
PCT Pub. Date: Jan. 17, 2013

(65) Prior Publication Data
US 2013/0223815 A1    Aug. 29, 2013

(30) Foreign Application Priority Data

Jul. 14, 2011  (JP) .................................. 2011-156136
Mar. 15, 2012  (JP) .................................. 2012-059411

(51) Int. Cl.
| | |
|---|---|
| *H04N 9/80* | (2006.01) |
| *H04N 5/76* | (2006.01) |
| *H04N 5/93* | (2006.01) |
| *H04N 9/87* | (2006.01) |
| *H04N 9/79* | (2006.01) |

(Continued)

(52) U.S. Cl.
CPC . *H04N 9/87* (2013.01); *H04N 5/76* (2013.01); *H04N 9/7921* (2013.01); *H04N 21/2353* (2013.01); *H04N 21/435* (2013.01); *H04N 21/816* (2013.01); *G09G 5/005* (2013.01); *G09G 2320/0613* (2013.01); *G11B 27/105* (2013.01); *H04N 5/208* (2013.01); *H04N 5/21* (2013.01); *H04N 5/765* (2013.01); *H04N 5/91* (2013.01); *H04N 5/917* (2013.01)

(58) Field of Classification Search
USPC .................. 386/239–248, 291–299, 353–357
See application file for complete search history.

(56) References Cited

U.S. PATENT DOCUMENTS

2005/0259752 A1*  11/2005  Iwata et al. ............... 375/240.26
2010/0220793 A1*  9/2010  Jang et al. ................ 375/240.25

(Continued)

FOREIGN PATENT DOCUMENTS

| JP | 2000-350144 A | 12/2000 |
| JP | 2006-222773 A | 8/2006 |

(Continued)

*Primary Examiner* — Hung Dang
(74) *Attorney, Agent, or Firm* — Birch, Stewart, Kolasch & Birch, LLP

(57) ABSTRACT

A television (1) of the present invention includes a CPU (118) which stores broadcast medium information and recording mode information in such a manner that the broadcast medium information and the recording mode information are related to a broadcast content and when the broadcast content is reproduced, automatically sets a degree of an image process carried out on the broadcast content by an image processing circuit (107) in accordance with the broadcast medium information and the recording mode information which are stored in such a manner as to be related to the broadcast content.

13 Claims, 10 Drawing Sheets

(51) Int. Cl.
  *H04N 21/235* (2011.01)
  *H04N 21/435* (2011.01)
  *H04N 21/81* (2011.01)
  *H04N 5/91* (2006.01)
  *H04N 5/765* (2006.01)
  *H04N 5/917* (2006.01)
  *H04N 5/208* (2006.01)
  *H04N 5/21* (2006.01)
  *G11B 27/10* (2006.01)
  *G09G 5/00* (2006.01)

(56) References Cited

U.S. PATENT DOCUMENTS

2011/0055873 A1* 3/2011 Heo et al. .................. 725/52
2011/0280543 A1   11/2011 Uchida et al.

FOREIGN PATENT DOCUMENTS

| JP | 2010-109857 A | 5/2010 |
| JP | 2010-251988 A | 11/2010 |
| JP | 2011-130365 A | 6/2011 |
| JP | 2011-244160 A | 12/2011 |

\* cited by examiner

F I G. 2
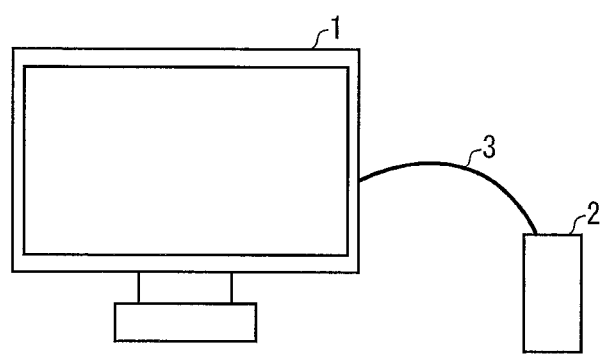

F I G. 4

| BROADCAST MEDIUM | | RECORDING MODE | DNR | GRADATION SMOOTHER | EDGE SHARPENING | HIGH DEFINITION |
|---|---|---|---|---|---|---|
| BS BROADCASTING | | DR MODE | 2 | 1 | 0 | 5 |
| | | MODE 1 | 4 | 3 | 1 | 6 |
| | | MODE 2 | 6 | 5 | 2 | 7 |
| TERRESTRIAL D BROADCASTING | | DR MODE | 3 | 2 | 1 | 6 |
| | | MODE 1 | 5 | 4 | 2 | 7 |
| | | MODE 2 | 7 | 6 | 3 | 8 |
| CS BROAD- CASTING | HD | DR MODE | 3 | 2 | 1 | 6 |
| | | MODE 1 | 5 | 4 | 2 | 7 |
| | | MODE 2 | 7 | 6 | 3 | 8 |
| | SD | DR MODE | 5 | 5 | 2 | 7 |
| | | MODE 1 | 7 | 7 | 3 | 8 |
| | | MODE 2 | 9 | 9 | 4 | 9 |

FIG. 5

| GENRE | RECORDING MODE | DNR | GRADATION SMOOTHER | EDGE SHARPENING | HIGH DEFINITION |
|---|---|---|---|---|---|
| MOVIE | DR MODE | 0 | 0 | 0 | 0 |
| | MODE 1 | -2 | -1 | 0 | 0 |
| | MODE 2 | -4 | -2 | +1 | +1 |

FIG. 7

| BROADCAST MEDIUM | | RECORDING MODE | DNR | GRADATION SMOOTHER | EDGE SHARPENING | HIGH DEFINITION |
|---|---|---|---|---|---|---|
| BS BROADCASTING | | DR MODE | 0x00 | 0x01 | 0x00 | 0x08 |
| BS BROADCASTING | | MODE 1 | 0x03 | 0x03 | 0x01 | 0x10 |
| BS BROADCASTING | | MODE 2 | 0x05 | 0x05 | 0x02 | 0x11 |
| TERRESTRIAL D BROADCASTING | | DR MODE | 0x01 | 0x02 | 0x01 | 0x08 |
| TERRESTRIAL D BROADCASTING | | MODE 1 | 0x04 | 0x04 | 0x02 | 0x10 |
| TERRESTRIAL D BROADCASTING | | MODE 2 | 0x06 | 0x06 | 0x03 | 0x11 |
| CS BROAD- CASTING | HD | DR MODE | 0x01 | 0x02 | 0x01 | 0x08 |
| CS BROAD- CASTING | HD | MODE 1 | 0x04 | 0x04 | 0x02 | 0x10 |
| CS BROAD- CASTING | HD | MODE 2 | 0x06 | 0x06 | 0x03 | 0x11 |
| CS BROAD- CASTING | SD | DR MODE | 0x04 | 0x05 | 0x02 | 0x10 |
| CS BROAD- CASTING | SD | MODE 1 | 0x07 | 0x07 | 0x03 | 0x13 |
| CS BROAD- CASTING | SD | MODE 2 | 0x09 | 0x09 | 0x04 | 0x14 |
| H.264 BROADCASTING | | DR MODE | 0x04 | 0x05 | 0x02 | 0x10 |
| H.264 BROADCASTING | | MODE 1 | 0x07 | 0x07 | 0x03 | 0x13 |
| H.264 BROADCASTING | | MODE 2 | 0x09 | 0x09 | 0x04 | 0x14 |
| 1-SEG BROADCASTING | | DR MODE | 0x05 | 0x06 | 0x03 | 0x11 |
| 1-SEG BROADCASTING | | MODE 1 | 0x08 | 0x08 | 0x04 | 0x14 |
| 1-SEG BROADCASTING | | MODE 2 | 0x10 | 0x10 | 0x05 | 0x15 |

F I G. 8

| GENRE | RECORDING MODE | DNR | GRADATION SMOOTHER | EDGE SHARPENING | HIGH DEFINITION |
|---|---|---|---|---|---|
| MOVIE | DR MODE | 0x00 | 0x00 | 0x00 | 0x00 |
| | MODE 1 | -0x02 | -0x01 | 0x00 | 0x00 |
| | MODE 2 | -0x04 | -0x02 | +0x01 | +0x01 |

F I G. 9

| USER | DNR | GRADATION SMOOTHER | EDGE SHARPENING | HIGH DEFINITION |
|---|---|---|---|---|
| USER 1 | +0x01 | 0x00 | 0x00 | 0x00 |
| USER 2 | −0x01 | 0x00 | +0x01 | 0x00 |
| USER 3 | 0x00 | +0x02 | −0x01 | +0x01 |
| ⋮ | ⋮ | ⋮ | ⋮ | ⋮ |

F I G. 1 0

|  | RECORDING MODE | DNR | GRADATION SMOOTHER | EDGE SHARPENING | HIGH DEFINITION |
|---|---|---|---|---|---|
| 3D IMAGE | DR MODE | 0x00 | 0x00 | +0x01 | +0x01 |
|  | MODE 1 | 0x00 | 0x00 | +0x01 | +0x01 |
|  | MODE 2 | 0x00 | 0x00 | +0x01 | +0x01 |

RECORDING/REPRODUCTION DEVICE, RECORDING/REPRODUCTION METHOD, TELEVISION RECEIVER, PROGRAM, AND RECORDING MEDIUM

TECHNICAL FIELD

The present invention relates to a recording and reproducing device for performing recording or reproducing a broadcast program and recording and reproducing methods for performing recording or reproducing a broadcast program. The present invention also relates to a television receiver provided with the recording and reproducing device, a program for operating the recording and reproducing device, and a recording medium in which the program is recorded.

BACKGROUND ART

In recent years, with fusion of broadcasting and communications and diversification of broadcast programs, needs from users to record more broadcast programs on satellite broadcasting, CATV broadcasting, IP broadcasting, or the like have been increasing. In response to such needs, television receivers capable of allowing to record more broadcast programs in a recording device have become popular. Such televisions are configured to reduce information volume of a broadcast program to be recorded (video-recorded) in a recording device (e.g. lower resolution of the broadcast program, lowering a bit rate of the broadcast program, or the like), thereby making it possible to record more broadcast programs.

Reducing the information volume in such a manner when recording a broadcast program has been a cause of noises in reproduction of the recorded broadcast program. To solve this problem, for example, techniques recited in Patent Literatures 1 and 2 were suggested.

Patent Literature 1 discloses an image display device for detecting a recording speed of a content and a bit rate of reproduction of the content and carrying out a video process on a video signal of the content in accordance with both of the recording speed and the bit rate thus detected.

Patent Literature 2 discloses an image reproducing device in which video signals can be optimally set according to an amount of bit rate automatically.

CITATION LIST

Patent Literatures

Patent Literature 1
Japanese Patent Application Publication, Tokukai, No. 2011-130365 A (Publication Date: Jun. 30, 2011)
Patent Literature 2
Japanese Patent Application Publication, Tokukai, No. 2000-350144 A (Publication Date: Dec. 15, 2000)

SUMMARY OF INVENTION

Technical Problem

However, according to the techniques described in Patent Literatures 1 and 2, only an image process in accordance with information volume of a broadcast program to be reproduced is carried out, and broadcast mediums of a broadcast program (e.g. terrestrial digital broadcasting, BS broadcasting, or the like) are not considered at all. Therefore, there is a problem that a suitable image process cannot be carried out for reproducing a recorded broadcast program.

This is because recorded broadcast programs of different broadcast media are recorded with different information volumes even if the recorded broadcast programs are not different in information volume when they are reproduced, and the difference in information volume results in the difference in amount of noises between the recorded broadcast programs.

The present invention is accomplished in view of the problem above, and a main object of the present invention is to provide a recording and reproducing device which is capable of carrying out the optimal image process on a broadcast program in accordance with a broadcast medium of the broadcast program.

Solution to Problem

In order to solve the foregoing problem, the recording and reproducing device of the present invention is a recording and reproducing device including (i) recording means for recording a broadcast content in a recording medium and (ii) reproducing means for reproducing the broadcast content recorded in the recording medium, said recording and reproducing device comprising: storing means for, when the recording means records a broadcast content in the recording medium, storing broadcast medium information indicative of a broadcast medium of the broadcast content and recording mode information indicative of a recording mode of the broadcast content in such a manner that the broadcast medium information and the recording mode information are related to the broadcast content; image processing means for carrying out an image process on the broadcast content before the reproducing means reproduces the broadcast content; and controlling means for controlling the image processing means, the controlling means automatically setting a degree of the image process carried out on the broadcast content by the image processing means in accordance with the broadcast medium information and the recording mode information which are stored in such a manner that the broadcast medium information and the recording mode information are related to the broadcast content.

In order to solve the foregoing problem, the method for recording and reproducing of the present invention is a method for recording and reproducing performed by a recording and reproducing device, including the steps of (i) recording a broadcast content in a recording medium and (ii) reproducing the broadcast content recorded in the recording medium, said method comprising the steps of: (a) when the broadcast content is recorded in the step (i), storing broadcast medium information indicative of a broadcast medium of the broadcast content and recording mode information indicative of a recording mode of the broadcast content in such a manner that the broadcast medium information and the recording mode information are related to the broadcast content; (b) carrying out an image process on the broadcast content before the broadcast content is reproduced in the step (ii); and (c) automatically setting a degree of the image process carried out on the broadcast content in the step (b) in accordance with the broadcast medium information and the recording mode information which are stored in such a manner that the broadcast medium information and the recording mode information are related to the broadcast content.

With the configuration, the image processing means carries out the image process on the broadcast content in accordance with the degree of the image process which is set automatically according to the broadcast medium information and the recording mode information which are stored in such a manner that they are related to the broadcast content to be reproduced.

This enables the image processing means to carry out the most appropriate image process on the broadcast content according to the recording mode, and also carry out the most appropriate image process on the broadcast content according to the broadcast medium.

Examples of the recording mode include a mode for recording a broadcast content with original resolution, a mode for recording a broadcast content with one-fourth of the original resolution, and a mode for recording a broadcast content with one-eighth of the original resolution.

Examples of the broadcast medium include terrestrial digital broadcasting, BS broadcasting, CS broadcasting, CATV broadcasting, and IP broadcasting.

Advantageous Effects of Invention

As described above, the recording and reproducing device of the present invention is a recording and reproducing device including (i) recording means for recording a broadcast content in a recording medium and (ii) reproducing means for reproducing the broadcast content recorded in the recording medium, said recording and reproducing device comprising: storing means for, when the recording means records a broadcast content in the recording medium, storing broadcast medium information indicative of a broadcast medium of the broadcast content and recording mode information indicative of a recording mode of the broadcast content in such a manner that the broadcast medium information and the recording mode information are related to the broadcast content; image processing means for carrying out an image process on the broadcast content before the reproducing means reproduces the broadcast content; and controlling means for controlling the image processing means, the controlling means automatically setting a degree of the image process carried out on the broadcast content by the image processing means in accordance with the broadcast medium information and the recording mode information which are stored in such a manner that the broadcast medium information and the recording mode information are related to the broadcast content.

Accordingly, the controlling means sets the degree of the image process in accordance with the broadcast medium information and the recording mode information, so that the image processing means can carry out the most appropriate image process on the broadcast content.

BRIEF DESCRIPTION OF DRAWINGS

FIG. 2 illustrates a configuration of a recording and reproducing system in accordance with an embodiment of the present invention.

FIG. 4 illustrates an example of a correction value table setting a degree of image processing in the image processing circuit in accordance with an embodiment of the present invention.

FIG. 5 illustrates an example of a movie offset table which is to be referred to in a case where a genre of a reproducing target program is a movie in a television of a modification example in accordance with an embodiment of the present invention.

FIG. 7 illustrates another example of the correction value table setting a degree of an image process in the image processing circuit in accordance with an embodiment of the present invention.

FIG. 8 illustrates another example of the movie offset table which is to be referred to in a case where a genre of a reproducing target program is a movie in a television of a modification example in accordance with an embodiment of the present invention.

FIG. 9 illustrates an example of a user offset table setting a degree of an image process in a television of another modification example in accordance with an embodiment of the present invention.

FIG. 10 illustrates an example of a 3D offset table which is to be referred to when determining a degree of an image process in a television of still another modification example in accordance with an embodiment of the present invention.

DESCRIPTION OF EMBODIMENTS

The following will discuss, with reference to the drawings, a recording and reproducing device in accordance with an embodiment of the present invention. Note that, because the recording and reproducing device in accordance with the present embodiment is realized as a television receiver having reception/reproducing/display functions in addition to a recording function and a reproducing function, the recording and reproducing device is hereinafter referred to as a "television". Note also that, an application of the present invention encompasses any recording and reproducing devices in general and is not limited to televisions.

First, a recording and reproducing system including the television of the present embodiment is described with reference to FIG. 2. FIG. 2 is a view illustrating a configuration of the recording and reproducing system of the present embodiment.

As illustrated in FIG. 2, the recording and reproducing system of the present embodiment includes a television (recording and reproducing device) 1 for recording and reproducing a broadcast program (broadcast content) received, a USB-HD drive (recording medium) 2 for storing the broadcast program to be recorded by the television 1, and a USB cable 3 for connecting the television 1 with the USB-HD drive 2. Note that, as explained later, the broadcast program is a program which is broadcasted by terrestrial digital broadcast, satellite broadcast, or the like and includes a moving image, a still image, a sound, and/or the like.

[Configuration of Television]

Figure 3:
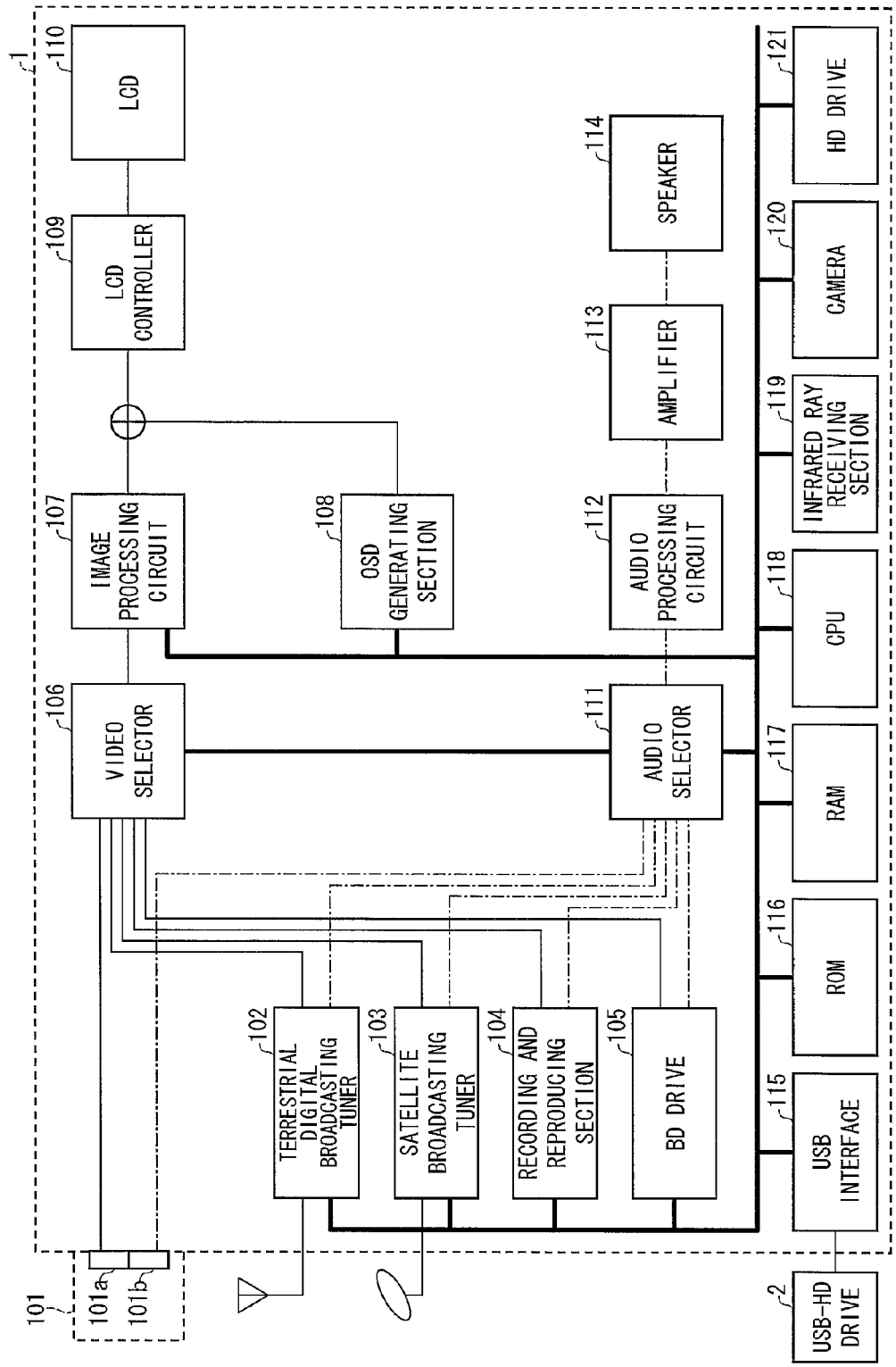
FIG. 3 is a block diagram illustrating a configuration of a television in accordance with an embodiment of the present invention.

Next, a configuration of the television 1 in accordance with the present embodiment is described with reference to FIG. 3. FIG. 3 is a block diagram illustrating a configuration of the television 1 of the present embodiment. As illustrated in FIG. 3, the television 1 is provided with an external input terminal 101, a terrestrial digital broadcasting tuner 102, a satellite broadcasting tuner 103, a recording and reproducing section 104, a BD drive 105, a video selector 106, an image processing circuit (an image processing means) 107, OSD (On-Screen Display) generating section 108, a LCD (Liquid Crystal Display) controller 109, a LCD 110, an audio selector 111, an audio processing circuit 112, an amplifier 113, a speaker 114, a USB (Universal Serial Bus) interface 115, a ROM 116, a RAM 117, a CPU (storing means and controlling means) 118, an infrared ray receiving section 119, a camera 120, and a HD drive 121. In FIG. 3, a path of video signals is illustrated in full line, a path of audio signals is illustrated in chain line, and paths (buses) of data and controlling signals are illustrated in heavy line. Further, as illustrated in FIG. 3, the USB-HD drive 2 is connected to the USB interface 115.

The external input terminal 101 includes a video input terminal 101a and an audio input terminal 101b. The video input terminal 101a is a terminal for receiving a video signal and may be a DVI terminal for example. The audio input terminal 101b is a terminal for receiving an audio signal and may be an S/PDIF terminal for example. Note that, the external input terminal 101 is not limited to these terminals, and may be a HDMI terminal in which the video input terminal 101a and the audio input terminal 101b are integrated with each other.

The terrestrial digital broadcasting tuner 102 is a tuner for receiving a broadcast program broadcasted by the terrestrial digital broadcasting. For example, the terrestrial digital broadcasting tuner 102 can be configured to have a RF section for converting received signals into analog baseband signals, an ADC section for converting the analog baseband signals into digital baseband signals, a demodulating section for demodulating a MPEG2 stream from the digital baseband signals, and a decoding section for decoding the video signals and the audio signals from the MPEG2 stream.

The MPEG2 stream demodulated by the terrestrial digital broadcasting tuner 102 is transmitted to the recording and reproducing section 104 via a bus. The video signals and the audio signals decoded by the terrestrial digital broadcasting tuner 102 are transmitted to the video selector 106 and the audio selector 111, respectively. The CPU 118 controls which channel is selected as a target for demodulation by the terrestrial digital broadcasting tuner 102.

Further, it is preferable that the terrestrial digital broadcasting tuner 102 is a double tuner which is capable of demodulating two MPEG2 streams broadcasted via different channels simultaneously. In this case, the terrestrial digital broadcasting tuner 102 transmits, to the recording and reproducing section 104, the MPEG2 stream broadcasted via a first channel selected as a target channel, while transmitting video signals and audio signals which are decoded from the MPEG2 stream to the video selector 106 and the audio selector 111, respectively. The terrestrial digital broadcasting tuner 102 transmits, to the recording and reproducing section 104, the MPEG2 stream broadcasted via a second channel selected as a target channel for recording.

Of course, the terrestrial digital broadcasting tuner 102 of the present invention is not limited to the double tuner. As an alternative, the terrestrial digital broadcasting tuner 102 can be a single tuner or a plurality of tuners including three or more tuners. In a case where the terrestrial digital broadcasting tuner 102 is a single tuner, only when a user is not watching a broadcast program, a MEPG2 stream indicating a broadcast program can be transmitted to the recording and reproducing section 104. In a case where the terrestrial digital broadcasting tuner 102 is composed of a plurality of tuners, it is possible to transmit, to the recording and reproducing section 104, MPEG2 streams indicating broadcast programs which are broadcasted via different channels with respect to each channel, each airwave or each viewer (e.g. a father, a mother, a child, and the like).

The satellite broadcasting tuner 103 is a tuner for receiving a broadcast program broadcasted by satellite broadcasting. The satellite broadcasting tuner 103 includes a BS broadcasting tuner for receiving BS broadcast programs broadcasted by a broadcasting satellite, and a CS broadcasting tuner for receiving CS broadcast programs broadcasted by a communication satellite. Further, the satellite broadcasting tuner 103 can be configured to have, for example, a RF section for converting received signals into analog baseband signals, a ADC section for converting the analog baseband signals into digital baseband signals, a demodulating section for demodulating a MPEG2 stream from the digital baseband signals, and a decoding section for decoding video signals from the MPEG2 stream.

The MPEG2 stream demodulated by the satellite broadcasting tuner 103 is transmitted to the recording and reproducing section 104. The video signals and the audio signals demodulated by the satellite broadcasting tuner 103 are transmitted to the video selector 106 and the audio selector 111, respectively. The CPU 118 selects which channel of the MPEG2 data stream is to be demodulated by the satellite broadcasting tuner 103.

Similarly with the terrestrial digital broadcasting tuner 103, it is preferable for the cases of the BS broadcasting tuner and the CS broadcasting tuner that the satellite broadcasting tuner 103 of the present embodiment is a double tuner capable of receiving two broadcast programs broadcasted via different channels simultaneously.

The recording and reproducing section 104 acquires a MPEG2 stream from any one of the terrestrial digital broadcasting tuner 102 and the satellite broadcasting tuner 103 and causes the MPEG2 stream thus acquired to be recorded in a recording device. Further, as explained later with reference to FIG. 1, the recording and reproducing section 104 includes a recording section 104a and a reproducing section 104b.

The recording section 104a can use, as a recording device for recording the MPEG2 stream, the BD drive 105 built in the television 1, the HD drive 121 built in the television 1, and the USB-HD drive 2 connected to the USB interface 115. The reproducing section 104b reads out the MPEG2 stream from the recording device, decodes video signals and audio signals from the MPEG2 stream thus read out, and transmits the video signals and the audio signals to the video selector 106 and the audio selector 111, respectively.

The four types of the video signals above are transmitted to the video selector 106. Namely, (1) a video signal transmitted from the external input terminal 101 (the picture input terminal 101a in particular), (2) a video signal decoded by the terrestrial digital broadcasting tuner 102, (3) a video signal decoded by the satellite broadcasting tuner 103, and (4) a video signal decoded by the recording and reproducing section 104 (the reproducing section 104b in particular) are inputted. The video selector 106 selects any one of the video signals (1) through (4). A video signal selected by the video selector 106 is transmitted to the image processing circuit 107. Note that, the CPU 118 decides which of the video signals is to be selected by the image selector 106.

The image processing circuit 107 carries out an image quality controlling process on the video signal thus transmitted from the video selector 106. The image processing circuit 107 also carries out a scaling process on the video signal transmitted from the video selector 106. Note here that the image quality controlling process refers to, for example, processing a video signal to change at least any one of brightness, sharpness, and contrast of an image indicated by the video signal. Note also that the scaling process refers to processing a video signal to uniformly enlarge or shrink an image indicated by the video signal. The video signal processed by the image processing circuit 107 is transmitted to the LCD controller 109. Note that, the CPU 118 controls how image quality and a size of an image are changed by the image processing circuit 107.

The OSD generating section 108 generates (renders) an OSD image from OSD data transmitted from the CPU 118. An example of the OSD image generated by the OSD generating section 108 is an electronic list of programs described later. For example, SVG (Scalable Vector Graphics) can be used as the OSD data. The OSD image generated by the OSD generating section 108 is overlapped with the video signal transmitted from the image processing circuit 107 and transmitted to the LCD controller 109.

In accordance with the video signal transmitted from the image processing circuit 107, the LCD controller 109 controls the LCD 110 so that an image indicated by the video signal is displayed. Further, when the OSD image is transmitted from the OSD generating section 108, the LCD controller 109 controls the LCD 110, in accordance with the video signal which is transmitted from the image processing circuit 107 and overlapped with the OSD image, so that an image indicated by the video signal is displayed.

The four types of the audio signals are transmitted to the audio selector 111. Namely, (1) an audio signal inputted by the external input terminal 101 (the audio input terminal 101b in particular), (2) an audio signal decoded by the terrestrial digital broadcasting tuner 102, (3) an audio signal decoded by the satellite broadcasting tuner 103, and (4) an audio signal decoded by the recording and reproducing section 104 (the reproducing section 104b in particular) are inputted. The audio selector 111 selects any one of the audio signals (1) through (4) above.

An audio signal selected by the audio selector 111 is transmitted to the audio processing circuit 112. The CPU 118 controls which audio signal is selected by the audio selector 111. Note that, selection of a video signal by the video selector 106 is matched with selection of an audio signal by the audio selector 111. For example, when the video selector 106 selects a video signal transmitted from the terrestrial digital broadcasting tuner 102, the audio selector 111 also selects an audio signal transmitted from the terrestrial digital broadcasting tuner 102.

The audio processing circuit 112 carries out a volume controlling process on audio signals transmitted from the audio selector 111. The audio processing circuit 112 also carries out a tone controlling process on the audio signals transmitted from the audio selector 111. Note here that a volume control process refers to processing an audio signal to change a volume of an audio indicated by the audio signal.

Note also that the tone controlling process refers to processing an audio signal to change frequency characteristics of an audio indicated by the audio signal (e.g. emphasizing low-pass frequency, emphasizing high-pass frequency, and the like). The audio signal processed by the audio processing circuit 112 is transmitted to the amplifier 113. Note that the CPU 118 controls how the volume and the tone are changed by the audio processing circuit 112.

The amplifier 113 drives the speaker 114, in accordance with an audio signal transmitted from the audio processing circuit 112, so that the speaker 114 can output the audio indicated by the audio signal.

The CPU 118 controls each of the members above in accordance with remote control signals received by the infrared-ray receiving section 119 and with images captured by the camera 120. Examples of controls by use of the infrared-ray receiving section 119 include (i) a control for changing receiving channels of the terrestrial digital broadcasting tuner 102 and the satellite broadcasting tuner 103 in accordance with the remote control signals, and (ii) a control for changing the video signals and the audio signals selected by the video selector 106 and the audio selector 111, respectively, in accordance with the remote control signals. Further, an example of a control by use of the camera 120 is a control for changing a way of adjusting image quality in the image processing circuit 107 according to a viewer specified on the basis of a captured image.

Further, the CPU 118 has a function of making a table of broadcast programs from EPG (Electronic Program Guide) data provided from broadcast stations. Note that the EPG data provided by broadcast stations can be obtained, for example, by use of the terrestrial digital broadcasting tuner 102 or the satellite broadcasting tuner 103, or from a server connected to the Internet via the Ethernet® interface (not illustrated).

The ROM 116 is a write-protected and read-only memory that stores fixed data such as a program executed by the CPU 118. On the other hand, the RAM 117 is a writable and accessible memory that stores reference data to be referred to by the CPU 118 for operation, and variable data generated by the operation by the CPU 118. For example, the table of broadcast programs is stored in the RAM 117.

The USB interface 115 is an interface for connecting USB equipment to the television 1. A representative example of USB equipment connectable to the television 1 is a recording device such as a HD (hard disc) drive. As illustrated in FIG. 3, the present embodiment discusses a case where the USB-HD drive 2 is connected to the USB interface 115 for example.

In the present embodiment, the USB-HD drive 2 (external HD drive) connected to the USB interface 115 is employed as a recording device for recording a taped broadcast program (hereinafter referred to as a recorded program as well). However, the present invention is not limited to this configuration. For example, the HD drive 121 built in the television 1 (built-in HD drive) and the BD drive 105 built in the television 1 (built-in BD drive) can be used as a recording device for recording a recorded program. In a case where the BD drive is connected to the television 1 via a USB port, the BD drive (external BD drive) can be used as a recording device for recording the recorded program. In a case where an optical disc drive other than the BD drive is connected to the television 1 via a USB port, this optical disc drive can be used as a recording medium for storing a recorded program or a recording medium such as a USB flash drive can be used as a recording medium for storing a recorded program. In brief, any recording medium can be used as long as the recording medium is capable of storing a recorded program.

Furthermore, an interface for connecting an external recording device to be used for storing a recorded program (referred to as the USB-HD drive 2 in the present embodiment) is also not limited to the USB interface 115. In other words, the USB interface 115 can be replaced with an ATA (Advanced Technology Attachment), an ATAPI (ATA Packet Interface), an IEEE1394, a HDMI (High-Definition Multimedia Interface), and an interface for wired network such as LAN, or an interface for wireless network such as IEEE80211. In a case where a SD card is connected to the television 1, the SD card can be used for storing a recorded program. In brief, any interface for connecting the external recording device can be used as long as it is capable of transmitting a recorded program.

In the present embodiment, a method of the terrestrial digital broadcasting is assumed to be a method for multiplexing the MPEG2 stream (an ATSC method in United States and an ISDB-T method in Japan etc.). However, the present invention is not limited to this method. That is, for example, the present invention can be also applied to a method for multiplexing the MPEG4 stream etc. (a DVB-T/DVB-T2 method in Europe) instead of multiplexing the MPEG2 stream. In the case of the latter, the demodulated MPEG4 stream may be stored as it is in the recording medium or the demodulated MPEG4 stream may be converted into a MPEG2 stream and stored in the recording medium.

[Configuration of Recording and Reproducing Section and Image Processing Circuit]

Figure 1:
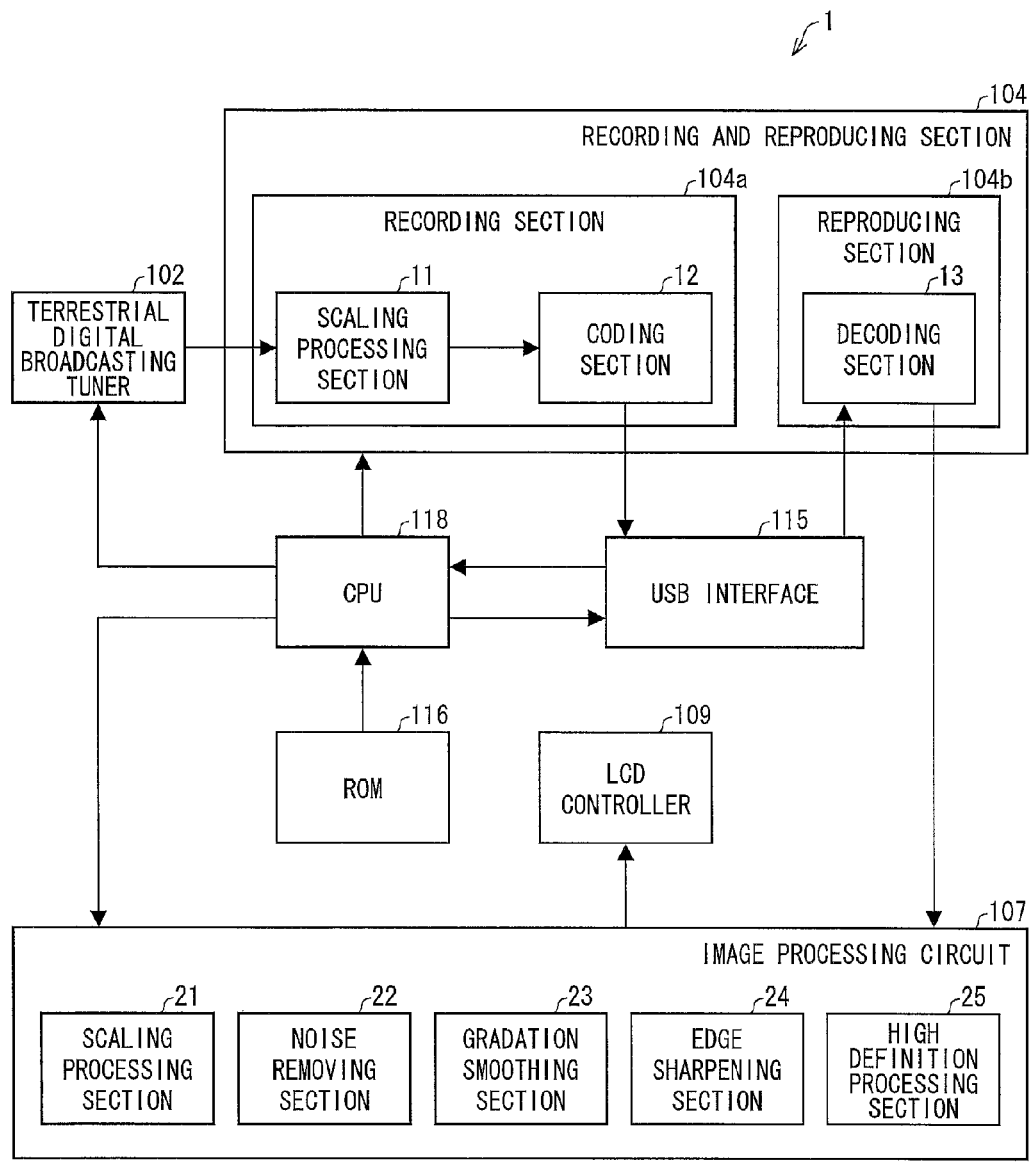
FIG. 1 is a block diagram illustrating a configuration of a recording and reproducing section and a configuration of an image processing circuit in accordance with an embodiment of the present invention.

Next, configurations of the recording and reproducing section 104 and the image processing circuit 107 are described with reference to FIG. 1. FIG. 1 is a block diagram illustrating configurations of the recording and reproducing section 104 and the image processing circuit 107 in accordance with the present embodiment.

As illustrated in FIG. 1, the recording and reproducing section 104 includes the recording section (recording means) 104a and the reproducing section (reproducing means) 104b. Further, the recording section 104a includes a scaling processing section 11 and a coding section 12. The reproducing section 104b includes a decoding section 13.

As illustrated in FIG. 1, the image processing circuit 107 includes a scaling processing section 21, a noise removing section (smoothing means) 22, a gradation smoothing section (smoothing means) 23, an edge sharpening section (edge sharpening/high definition processing means) 24, and a high definition processing section (edge sharpening/high definition processing means) 25. In the present embodiment, the smoothing means is composed of the noise removing section 22 and the gradation smoothing section 23. The edge sharpening/high definition means is composed of the edge sharpening section 24 and the high definition processing section 25.

With the recording and reproducing section 104 and the image processing circuit 107 which are configured as described above, the television 1 of the present embodiment can carry out a recording process and a reproducing process described below. Note that, the following discusses a recording function of recording a broadcast program received by the terrestrial digital broadcasting tuner 102. However, a recording function of recording a broadcast program received by the satellite broadcasting tuner 103 can also be realized.

(Recording Process)

First, a recording process of the television 1 in accordance with the present embodiment is described below.

The CPU 118 changes receiving channels of the terrestrial digital broadcasting tuner 102 so that a broadcast program to be recorded can be received from a channel (hereinafter referred to as a recording target channel) that broadcasts a broadcast program for which a user has made recording setting in advance (hereinafter referred to as a recording target program).

The terrestrial digital broadcasting tuner 102 receives the recording target program which is broadcasted via the recording target channel changed by the CPU 118. The recording target program received by the terrestrial digital broadcasting tuner 102 is decoded in the decoding section provided in the terrestrial digital broadcasting tuner 102 and transmitted to the scaling processing section 11 provided in the recording section 104a.

The scaling processing section 11 carries out a scaling process on the recording target program transmitted from the terrestrial digital broadcasting tuner 102. At this point, the CPU 118 informs the scaling processing section 11 of a recording mode (taping mode) deciding instruction for instructing what resolution the recording target program is to be recorded with.

The recording mode deciding instruction is an instruction of notifying whether the recording target program is to be recorded with, for example, (1) original resolution (hereinafter also referred to as DR Mode), (2) one-fourth resolution of the original resolution (hereinafter also referred to as Mode 1), or (3) one-eighth resolution of the original resolution (hereinafter also referred to as Mode 2).

When the scaling processing section 11 receives from the CPU 118 a recording mode deciding instruction which indicates recording of the recording target program in Mode 1, the scaling processing section 11 scales down resolution of the recording target program to one-fourth. When the scaling processing section 11 receives a recording mode deciding instruction which indicates recording of the recording target program in Mode 2, the scaling processing section 11 scales down resolution of the recording target program to one-eighth. Further, the scaling processing section 11 transmits the broadcast program whose resolution was scaled down to the coding section 12.

The coding section 12 codes the recording target program whose resolution was scaled down in the scaling processing section 11. For example, a recording target program can be coded into a MPEG2 stream, a MPEG4 stream, and the like.

The recording section 104a causes the recording target program whose resolution was scaled down in the scaling processing section 11 and which was coded in the coding section 12 to be stored in the USB-HD drive 2 via the USB interface 115.

At this point, the CPU 118 causes broadcast medium information indicative of a broadcast medium (terrestrial digital broadcasting in this case) of the recording target program to be stored in the USB-HD drive 2 via the USB interface 115 in such a manner that the broadcast medium information is related to the recording target program. For example, the CPU 118 can specify the broadcast medium to which the recording target channel belongs, as the broadcast medium of the recording target program. Note that, a broadcast medium represents a type of broadcast such as the terrestrial digital broadcasting, the BS broadcasting, the CS broadcasting, the CATV broadcasting, IP broadcasting, or the like.

Furthermore, other examples of a type of broadcast include 1-seg (one-segment) broadcasting and broadcasting that uses a broadcasting standard employing the H.264 profile (e.g. an ATSC standard which is a broadcasting standard in North America, DVB standard which is a broadcasting standard in Europe) (hereinafter also referred to as H.264 broadcasting).

The CPU 118 causes recording mode information (taping mode information) of the recording target program whose resolution was scaled down in the scaling processing section 11 to be stored in the USB-HD drive 2 via the USB interface 115 in such a manner that the recording mode information is related to the recording target program. Hereinafter, broadcast medium information and recording mode information are referred to as recording information as well.

In this manner, the recording target program is related to the recording information by the CPU 118 in the recording process.

Note that, in the present embodiment, a configuration example is described that the CPU 118 changes receiving channels of the terrestrial digital broadcasting tuner to select a channel via which a recording target program set by a user in advance is broadcasted. However, the present invention is not limited to this configuration. For example, in a case where a recording target program is designated by a user via the infrared ray receiving section 119, the CPU 118 can change receiving channels of the terrestrial digital broadcasting tuner 102 to receive the designated recording target program from a recording target channel via which the designated recording target program is broadcasted.

Further, a mode indicated by the recording mode deciding instruction is described above with examples of three modes: (1) a mode of recording with original resolution, (2) a mode of recording with one-fourth resolution, and (3) a mode of recording with one-eighth resolution. However, the present invention is not limited to these three modes. For example, as a mode indicated by the recording mode deciding instruction, a mode of recording with a half of the original resolution, a mode of recording with one-sixth of the original resolution, and the like can be used.

Although a configuration example that the recording information is stored in the USB-HD drive 2 is described in the present embodiment, the present invention is not limited to this configuration. For example, the CPU 118 can cause the recording information to be stored in the HD drive 121 built in the television 1 in such a manner that the recording information is related to a recording target program. In other words, the recording information can be stored in any memory device as long as the recording information is related to the recording target program.

Furthermore, although a configuration example that the recording target program is stored in the USB-HD drive 2 is described in the present embodiment, the present invention is not limited to this configuration. For example, the recording section 104*a* may record the recording target program by storing the program in the HD drive 121 built in the television 1, or may record the recording target program by recording the program in the BD drive 105 built in the television 1.

In the present embodiment, a configuration that the CPU 118 specifies a broadcast medium to which a recording target channel as a broadcast medium of a recording target program is described. However, the present invention is not limited to this configuration. For example, the present invention can be configured such that the broadcast medium of the recording target program is specified in accordance with a format of the recording target program.

Generally, a resolution of a recording target program is (i) "1920×1080" if a broadcast medium is the "BS broadcasting", (ii) "1440×1080" if a broadcast medium is the "terrestrial digital broadcasting", and (iii) "480×480" if a broadcast medium is a certain channel of the "CS broadcasting". In addition, a resolution of a recording target program is "1280×720" or "720×480" if a broadcast medium is another channel of the "CS broadcasting", and is "352×480" at maximum if a broadcast medium is the "1-seg broadcasting". Furthermore, if a recording target program is a 3D image (a three-dimensional image) of a side-by-side method, horizontal resolution of the aforementioned resolution is reduced by half.

Therefore, a broadcast medium can be specified by analyzing resolution of a recording target program.

(Reproducing Process)

Next, a reproducing process of the television 1 in accordance with the present embodiment is described below.

After receiving via the infrared ray receiving section 119 an instruction to reproduce a recording target program stored in the USB-HD drive 2, which instruction is given by a user operating a remote control or the like, the CPU 118 instructs the recording and reproducing section 104 to read out the requested recording target program as a reproducing target program from the USB-HD drive 2.

The reproducing section 104*b* provided in the recording and reproducing section 104 obtains via the USB interface 115 the coded reproducing target program stored in the USB-HD drive 2 in accordance with the instruction from the CPU 118. Here, the reproducing target program is coded into, for example, a MPEG2 stream, a MPEG4 stream, or the like. After obtaining the coded reproducing target program, the reproducing section 104*b* causes the decoding section 13 to decode the reproducing target program. The reproducing section 104*b* transmits, via the video selector 106 to the image processing circuit 107, a video signal indicative of the reproducing target program decoded by the decoding section 13.

The image processing circuit 107 causes the scaling processing section 21 to carry out a scaling process on the video signal indicative of the reproducing target program which is transmitted from the reproducing section 104*b*, so that an image indicated by the video signals is scaled up or down to have a size suitable for display on the LCD 110.

The image processing circuit 107 causes the video signal indicative of the reproducing target program having been subjected to the scaling process by the scaling processing section 21 to be subjected to a noise reduction process by the noise removing section 22, the gradation smoothing process by the gradation smoothing section 23, the edge sharpening process in the edge sharpening section 24, and a high definition process by the high definition processing section 25. As described later, the noise removing section 22, the gradation smoothing section 23, the edge sharpening section 24, and the high definition processing section 25 carry out the image processing in accordance with information, which is provided from the CPU 118, indicative of a degree of the image processing to be carried out by each of the processing sections 22 through 25.

After instructing the recording and reproducing section 104 to read out the reproducing target program, the CPU 118 reads out recording information which is related to that reproducing target program thus read out according to the instruction, sets up automatically a degree of the image processing to be carried out by the image processing circuit 107 on a reproducing target content, and transmits the degree to the image processing circuit 107. Specifically, the CPU 118 obtains from the ROM 116 a correction value table (a table) which sets in advance, according to the recording information, a degree of the image processing to be carried out on the reproducing target program. Then, the CPU 118 transmits to the image processing circuit 107 a value indicative of the degree of the image processing determined in accordance with the correction value table. This enables the image processing circuit 107 to carry out the image processing in accordance with a broadcast medium of the supplied reproducing target program and a recording mode of the supplied reproducing target program.

Here, the correction value table is described with reference to FIG. 4. FIG. 4 is a view illustrating an example of the correction value table for setting a degree of the image processing in the image processing circuit 107 of the present embodiment.

As illustrated in FIG. 4, the correction value table sets in advance values indicative of degrees of image processes to be carried out by the noise removing section 22, the gradation smoothing section 23, the edge sharpening section 24, and the high definition processing section 25, respectively (referred to as DNR, Gradation Smoother, Edge Sharpening, and High Definition respectively in FIG. 4), in accordance with a broadcast medium of the reproducing target program and a recording mode at the time of recording.

For example, in a case where the broadcast medium is "BS broadcasting" and the recording mode is "Mode 1", the correction value table indicates that a degree of the noise reduction process carried out by the noise removing section 22 on the video signal indicative of the reproducing target program is "4", a degree of the gradation smoothing process carried out by the gradation smoothing section 23 thereon is "3", a degree of the edge sharpening process carried out by the edge sharpening section 24 thereon is "1", and a degree of the high definition process carried out by the high definition processing section 25 thereon is "6" (see FIG. 4).

Numerical values of the correction value table indicate coefficients to parameters of the noise reduction process, the gradation smoothing process, the edge sharpening process, and the high definition process.

Further, in the correction value table, with respect to the same broadcast medium, the greater degrees of the image processing to be carried out by the processing sections 22 through 25 are set for the recording mode with lower resolution. In other words, values in the correction value table are set so that the degrees of the image processing carried out by the respective processing sections 22 through 25 are greater as the resolution specified by the recording mode information is lower.

Moreover, the correction value table is configured such that even if reproducing target programs are recorded in a recording mode with the same resolution, the values indicative of the degrees of the image processes carried out by the respective processing sections 22 through 25 vary depending on broadcast mediums of the reproducing target programs. For example, in a case where the recording mode is a "DR Mode", a degree of the noise reducing process to be referred to is "2" if the broadcast medium is "BS broadcasting", while the degree of the noise reducing process to be referred to is "3" if the broadcast medium is "Terrestrial D (digital) broadcasting".

By referring to this correction value table, the CPU 118 can set up automatically the degree of the image processing carried out on a video signal indicative of the reproducing target program by the image processing circuit 107, in accordance with the broadcast medium information and the recording mode information which are stored in such a manner as to be related to the reproducing target program.

The noise removing section 22 carries out, on the video signal of the reproducing target program, the noise reduction process for removing noises which differ depending on recording modes of reproducing target programs (so-called MPEG noises) in accordance with a degree of the noise reduction process which degree is notified from the CPU 118. This makes it further possible to remove noises such as, so called, block noises, mosquito noises, random noises, dot noises and the like.

The gradation smoothing section 23 carries out the gradation smoothing process on the video signal indicative of the reproducing target program which signal has been subjected to the noise reduction process by the noise removing section 22 in accordance with a degree of the gradation smoothing process which degree has been notified from the CPU 118. This makes it possible to remove noises such as, so called block noises, mosquito noises, and the like.

Here, an image indicated by the video signal indicative of the reproducing target program which has been subjected to the noise reduction process by the noise removing section 22 and the gradation smoothing section 23, is rather blurred than the original image indicated by the video signal indicative of the reproducing target program. That is, the noise removing section 22 and the gradation smoothing section 23 can remove noises contained in a reproducing target program, however, there is likely to be a side effect that an outline of an image of the reproducing target program blurs, so that sharpness and fineness deteriorate.

In order to deal with this, the edge sharpening section 24 carries out, in accordance with a degree of the edge sharpening process which degree has been notified from the CPU 118, the edge sharpening process for sharpening an outline of an image on the video signal of the reproducing target program which has been blurred by the noise removing process carried out by the noise removing section 22 and the gradation smoothing section 23. This enables the edge sharpening section 24 to restore the sharpness lost in the video signal indicative of the reproducing target program.

The high definition processing section 25 carries out, in accordance with a degree of the high definition process which degree has been notified from the CPU 118, the high definition process on the video signal indicative of the reproducing target program which has been subjected to the edge sharpening process by the edge sharpening section 24. This enables the high definition processing section 25 to restore the fineness lost in the video signal indicative of the reproducing target program.

This makes it possible to set up automatically the edge sharpening (e.g., outline correction or the like) and the high definition (so-called super high resolution) of the reproducing target program, thereby restoring the sharpness and fineness which are lost by the noise reduction and realizing higher image quality.

The image processing circuit 107 transmits to the LCD controller 109 the video signal indicative of the reproducing target program which signal has been processed in each of the processing sections 22 through 25. The LCD controller 109 causes the LCD 110 to display the image indicated by the video signal of the reproducing target program thus transmitted.

Note that, in the present embodiment, the image processing in the respective processing sections 22 through 25 of the image processing circuit 107 are all carried out on the video signal indicative of the reproducing target program. However, the present invention is not limited to this case. For example, on the video signal indicative of the reproducing target program, the image processing can be carried out by at least one of the noise removing section 22 and the gradation smoothing section 23, and the image processing can be carried out by at least one of the edge sharpening section 24 and the high definition processing section 25.

Note that, in the present embodiment, the configuration example that the CPU 118 sets a degree of the image processing carried out by each of the processing sections 22 through 25 of the image processing circuit 107 is described. However, the present invention is not limited to this configuration. For example, the present invention may be arranged such that the image processing circuit 107 determines the degree of the image processing to be carried out by each of the processing sections 22 through 25 in accordance with the correction value table and the recording information which are supplied from the CPU 118.

The image processing circuit 107 of the present embodiment can be further configured to include an IP converter for converting an interlace video signal into a progressive video signal, a two-dimensional filter section for removing noise components of the video signal in accordance with a correlation between pixels in one frame, a three-dimensional filter section for removing the noise components of the video signals by performing weighted addition of a video signal in a certain frame to a video signal in a previous frame of the certain frame (any of these members are not illustrated), or the like.

With these members, the image processing circuit 107 can further remove noises accurately.

In a case where the video signal indicative of the reproducing target program is a "side by side" three-dimensional video signal, "top and bottom" three-dimensional video signal or the like, when the decoding section 13 decodes the MPEG2 stream of the reproducing target program composed of a transport stream, flickers and color migration are likely to be caused. To solve this problem, there may be provided another table in which the degrees of the image processing by each of the processing sections 22 through 25 are set to be lower.

(Another Example of Correction Value Table)

Another example of a correction value table is described with reference to FIG. 7. FIG. 7 is a view illustrating another example of the correction value table for setting a degree of image processing in the image processing circuit 107 of the present embodiment.

In addition to the values set in advance in the correction value table illustrated in FIG. 4, values indicative of degrees of the image processing for these cases where a broadcast medium is "H.264 broadcasting" and a broadcast medium is "1-seg broadcasting" are set in advance in the correction value table illustrated in FIG. 7. Note that, the correction value table in FIG. 7 sets the values in hexadecimal.

Numeric values of the correction value table in FIG. 7 indicate coefficients for parameters of the noise reduction process, the gradation smoothing process, the edge sharpening process, and the high definition process carried out in the noise removing section 22, the gradation smoothing section 23, the edge sharpening section 24, and the high definition processing section 25, respectively (i.e., values indicative of degrees of the image processing) (referred to as DNR, Gradation Smoother, Edge Sharpening, and High Definition respectively in FIG. 7), which are provided in the image processing circuit 107.

In the correction value table in FIG. 7 as well as in the correction value table in FIG. 4, with respect to the same broadcast medium, a degree of the image processing carried out by each of the processing sections 22 through 25 is set to be greater as resolution of a recording mode is lower. The correction value table is configured such that even if reproducing target programs are recorded in a recording mode with the same resolution, the values indicative of the degrees of the image processes carried out by the respective processing sections 22 through 25 vary depending on the broadcast mediums of the reproducing target programs.

For example, in the correction value table illustrated in FIG. 7, in a case where a broadcast medium is "BS broadcasting" and a recording mode is "Mode 1", values indicative of degrees of the image processing on a video signal indicative of a reproducing target program are set as follows: DNR "0x03", Gradation Smoother "0x03", Edge Sharpening "0x01", and High definition "0x08". Further, in a case where the broadcast medium is "BS broadcasting" and the recording mode is "Mode 2", values indicative of degrees of the image processing on a video signal indicative of a reproducing target program are set as follows: DNR "0x05", Gradation Smoother "0x05", Edge Sharpening "0x02", and High Definition "0x11".

Moreover, in a case where the broadcast medium is "H. 264 broadcasting" and the recording mode is "Mode 1", the values indicative of the degrees of the image processing on a video signal indicative of a reproducing target program are set as DNR "0x07", Gradation Smoother "0x07", Edge Sharpening "0x03", and High definition "0x13". In a case where the broadcast medium is "1-seg broadcasting" and the recording mode is "Mode 1", the values indicative of the degrees of the image processing on the video signal indicative of the reproducing target program is set as DNR "0x08", Gradation Smoother "0x08", Edge Sharpening "0x04", and High Definition "0x14".

Because broadcast mediums (format) adopted in different countries are generally different from each other, the display device of the present invention may be provided with a correction value table in which appropriate values are set for broadcast mediums adopted in various countries. The correction value table can also be set optionally by a user.

Modification Example 1

In the reproducing process of the television 1 of the present embodiment, the configuration example that a degree of the image processing to be carried out on the reproducing target program is determined in accordance with the recording information including the broadcast medium information and the recording mode information. However, the present invention is not limited to this configuration.

For example, the present invention may be arranged such that the degree of the image processing to be carried out on the reproducing target program is determined in accordance with genre information in addition to the broadcast medium information and the recording mode information. With reference to FIGS. 5 and 8, the following will discuss the configuration that the degree of the image processing to be carried out on the reproducing target program is determined according to the broadcast medium information, the recording mode information, and the genre information.

In this case, in the recording process above, the CPU 118 correlates the recording target program with the genre information and causes the genre information correlated with the recording target program to be stored in the USB-HD drive 2 together with the broadcast medium information and the recording mode information.

The present modification example discusses a configuration in which when the genre of the reproducing target program is a movie, values indicative of degrees of the image processing set in the correction value table in FIGS. 4 and 7 are adjusted by referring to an offset table illustrated in FIGS. 5 and 8.

Note that, the genre information can be obtained by referring to EPG supplied from broadcast stations.

Figure 6:
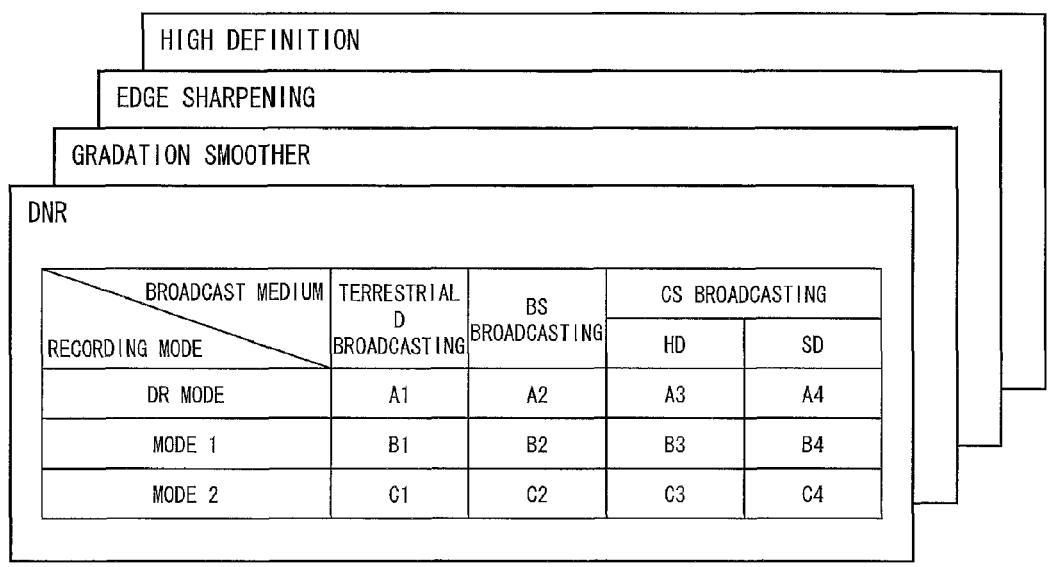
FIG. 6 illustrates an example of a table setting a degree of an image process in a television of another modification example in accordance with an embodiment of the present invention.

FIG. 5 is a view illustrating an example of a movie offset table which is to be referred to in a case where a genre of a reproducing target program is a movie in the television 1 in accordance with the present modification example. FIG. 8 is a view illustrating another example of the movie offset table which is to be referred to in a case where the genre of a reproducing target program is a movie in the television 1 in accordance with the present modification example. As illustrated in FIGS. 5 and 6, in a case where the genre of the program is a movie, the movie offset table sets values for adjusting values indicative of degrees of the image processing which are set in the correction value table in accordance with the recording modes.

Numeric values of the movie offset table indicate offset values for adjusting coefficients for the parameters of the noise reduction process, the gradation smoothing process, the edge sharpening process, and the high definition process carried out by the processing sections 22 through 25, respectively, of the image processing circuit 107.

For example, in a case where the reproducing target program is recorded in the recording mode "Mode 1" and a broadcast medium thereof is "BS broadcasting", the degree of the noise reduction process to be carried out by the noise removing section 22 is offset from "4" which is set in the correction value table in FIG. 4 by "−2" which is set in the movie offset table in FIG. 5 to become "2". Likewise, the degree of the gradation smoothing process carried out in the gradation smoothing section 23 is offset from "3" by "−1" to become "2". The degree of the edge sharpening process to be carried out by the edge sharpening section 24 remains "1". The degree of the high definition process to be carried out by the high definition processing section 25 remains "6".

Likewise, in a case where the reproducing target program is recorded in the recording mode "Mode 2" and a broadcast medium thereof is "Terrestrial D Broadcasting", the degree of the noise reduction process to be carried out by the noise removing section 22 is offset from "7" by "−4" to become "3". The degree of the gradation smoothing process to be carried out by the gradation smoothing section 23 is offset from "6" by "−2" to become "4". The degree of the edge sharpening process to be carried out by the edge sharpening section 24 is offset from "3" by "+1" to become "4". The degree of the high definition process to be carried out by the high definition processing section 25 is offset from "8" by "+1" to become "9".

Further, in a case where the reproducing target program is recorded in the recording mode "Mode 1" and a broadcast medium thereof is "1-seg broadcasting", the degree of the noise reduction process to be carried out by the noise removing section 22 is offset from "0x08" which is set in the correction value table in FIG. 7 by "−0x02" which is set in the movie offset table in FIG. 8 to become "0x06". Likewise, the degree of the gradation smoothing process to be carried out by the gradation smoothing section 23 is offset from "0x08" by "−0x01" to become "0x07". The degree of the edge sharpening process to be carried out by the edge sharpening section 24 remains "0x04". The degree of the high definition process to be carried out by the high definition processing section 25 remains "0x14".

In this manner, in a case where the genre of the reproducing target program is a movie, the degrees of the image processing by the noise removing section 22 and the gradation smoothing section 23 are adjusted to be less than or equal to a degree set in advance in the correction value table. This can prevent grain noises from being removed more than necessary in the noise removing section 22 and the gradation smoothing section 23.

In a case where the genre of the reproducing target program is a movie, the degrees of the image processing by the edge sharpening section 24 and the high definition processing section 25 are adjusted to be greater than or equal to the degree set in advance in the correction value table. This makes it possible to emphasize the grain noises removed in the noise removing section 22 and the gradation smoothing section 23 and reproduce the grain noises.

The present modification example discusses the configuration in which genre information obtained from the EPG is related to a recording target medium so as to allow determining whether the genre of a reproducing target program is a movie or not. However, the present invention is not limited to this configuration. For example, there may be employed a configuration that specifies whether the reproducing target program is a movie or not by providing the image processing circuit 107 with a determining section (not illustrated) for determining whether a video signal of the reproducing target program is a video signal having been subjected to a 2, 3 pull-down process (converting images recorded in a motion picture film etc. at 24 frames per second into video signals at 60 fields per second used for broadcasting etc.).

In a case where the image processing circuit 107 includes an IP converter (not illustrated), if a genre of a reproducing target program is a movie, combing noises are likely to be caused. Therefore, it is preferable to set an intra-frame process (i.e., a process carried out on a still image) as a process in the IP converter according to the recording modes.

Modification Example 2

The foregoing description discussed a configuration example for referring to one correction value table that correlates a broadcast medium and a recording mode with a value indicating a degree of the image processing to be carried out on the reproducing target program. However, the present invention is not limited to this configuration.

For example, as illustrated in FIG. 6, the ROM 116 can be configured to store individually a DNR table for determining a degree of the noise reduction process carried out by the noise removing section 22, a gradation smoother table for determining a degree of the gradation smoothing process carried out by the gradation smoothing section 23, an edge sharpening table for determining a degree of the edge sharpening process carried out by the edge sharpening section 24, and a high definition table for determining a degree of the high definition process carried out by the high definition processing section 25. FIG. 6 is an example of a table in accordance with the modification example 2 of the present invention.

Further, there may be provided the DNR table, the gradation smoother table, the edge sharpening table, and the high definition table, or the correction value table with respect to each user who uses the television 1. The CPU 118 can cause user information of a user who makes setting for recording a recording target program (makes recording setting) to be stored in the USB-HD drive 2 in such a manner that the user information is related to the recording target program.

With this configuration, in the reproducing process, the CPU 118 can read out the user information and supply to the image processing circuit 107 values indicative of the degrees of the image processing which are set in the correction value table corresponding to the user indicated by the user information or in the DNR table, the gradation smoother table, the edge sharpening table, and the high definition table each corresponding to the user indicated by the user information. This enables the image processing circuit 107 to carry out, on the video signal of the reproducing target program, the image processing suitable for preference of a user who makes recording setting.

In the reproducing process of the television 1 of the present modification example, the configuration that the image processing is carried out according to the preference of a user who has set up recording of the reproducing target program (user who gives instruction of recording a broadcast content) may be, for example, a configuration that values set in the correction value table are adjusted by offset values (adjusting values) set for each user who uses the television 1.

The adjustment of the values set in the correction value table by the offset values may be processed, for example, by the image processing circuit 107 in accordance with a user offset table in which the offset values are set for each user. The user offset table may be stored, for example, in the RAM 117.

The user information for specifying a user who has set up recording may be related to the recording target program and stored in the USB-HD drive 2 by the CPU 118. The user offset table may be stored in the RAM 117 for example.

Here, with reference to FIGS. 7 and 9, a description will be provided as to a configuration that the degree of the image processing carried out on the reproducing target program is determined according to the correction value table and the user offset table.

FIG. 9 is a view illustrating an example of a user offset table to be referred to when the image processing circuit 107 in the television 1 of the present modification example determines the degree of the image processing carried out on the reproducing target program. As illustrated in FIG. 9, in the user offset table, offset values for adjusting, for each user, the values indicative of the degrees of the image processing which are set in the correction value table are set.

For example, in a case where the reproducing target program is recorded in the recording mode "Mode 1" and a broadcast medium thereof is "BS broadcasting" and a user who has set up recording is a "User 2", the degree of the noise reduction process carried out by the noise removing section 22 is offset from "0x03" set in the correction value table in FIG. 7 by "−0x01" set in the user offset table in FIG. 9 to become "0x02". Likewise, the degree of the gradation smoothing process carried out by the gradation smoothing section 23 remains "0x03". The degree of the edge sharpening process carried out by the edge sharpening section 24 is offset from "0x01" by "+0x01" to become "0x02". The degree of the high definition process carried out by the high definition processing section 25 remains "0x10".

With the configuration, the image processing circuit 107 can carry out processes in the respective processing sections 22 through 25 on the reproducing target program with a use of values (degrees) set by the CPU 118 with reference to the correction value table and the user offset table.

This enables the image processing circuit 107 to carry out, on the video signal of a reproducing target program, the image processing according to the preference of the user who has set up recording. Therefore, the television 1 can provide a user with the reproducing target program having been subjected to the image processing suitable for the preference of the user who has set up recording of the reproducing target program.

One example of a method for setting offset values in the user offset table is a method in which a user causes by a remote control the television 1 to transit into an offset value setting mode which receives setting of offset values for each user and inputs an offset value suitable for the user's preference by the remote control in the offset value setting mode.

Examples of a method for specifying a user who set up recording include a method for specifying a user from a picture taken by the camera 120 provided in the television 1, and a method for specifying a user on the basis of a finger pattern read out by a finger pattern sensor (not illustrated). In addition, there is another method for specifying a user by the television 1 in accordance with information such as a telephone number obtained from a mobile phone, a smart phone etc. and an ID number of a SIM card.

With the configuration, for example, by setting values in a correction value table or edge sharpening table corresponding to a child user to be smaller than those in a correction value table or edge sharpening table corresponding to an adult user, it is possible to weaken the edge sharpening process on a video signal of a reproducing target program for which the child user has made recording setting. This enables the video signal of that reproducing target program to be indicative of a less provocative image.

Modification Example 3

Resolutions of broadcast programs broadcasted by SD broadcasting or the like of CS broadcasting vary depending on broadcast stations. In a case where resolutions of broadcast programs are different depending on broadcast stations, even if the resolutions after the scaling process in the scaling processing section 11 of the recording section 104a are the same, the lower the resolutions before the scaling process were, the more noises are likely to be caused.

In this case, in the correction value table above, in place of the configuration that values indicative of the degrees of the image processing corresponding to the recording modes are set with respect to each broadcast medium, there may be employed a configuration that values indicative of the degrees of the image processing corresponding to the recording modes are set with respect to each broadcast station.

Modification Example 4

The foregoing description discussed a configuration example that in the reproducing process of the television 1 of the present embodiment, a value indicative of the degree of the image processing to be carried out on the reproducing target program is determined in accordance with the recording information including the broadcast medium information and the recording mode information. However, the present invention is not limited to this configuration. For example, in a case where the reproducing target program is a 3D image of the side-by-side method, a configuration that an appropriate image processing is carried out on the reproducing target program of such a 3D image may be, for example, a configuration that values set in the correction value table are adjusted by offset values (offset values for a 3D image) which are to be applied to a case where the reproducing target program is a 3D image.

Adjustment of values set in the correction value table by offset values may be made by the image processing circuit 107 in accordance with a 3D offset table in which offset values for a 3D image is set. The 3D offset table may be stored in the RAM 117 for example.

Here, with reference to FIGS. 7 and 10, a description will be provided as to a configuration that the degree of image processing carried out on the reproducing target program is determined in accordance with the correction value table and the 3D offset table.

FIG. 10 is a view illustrating an example of a 3D offset table which is to be referred to when determining a degree of the image processing carried out on the reproducing target program in the television 1 of the present modification example. As illustrated in FIG. 1Q, the 3D offset table sets offset values for adjusting values indicative of degrees of the image processing which are set in the correction value table.

For example, in a case where a broadcast medium is the "BS Broadcasting" and a reproducing target program is recorded with a recording mode "Mode 1" and is a 3D image of the side-by-side method, the degree of the noise reduction process carried out by the noise removing section 22 is offset from "0x03" set in the correction value table illustrated in FIG. 7 by "0x00" set in the user offset table illustrated in FIG. 9 and remains "0x03". Likewise, the degree of the gradation smoothing process carried out by the gradation smoothing section 23 remains "0x03". The degree of the edge sharpening process carried out by the edge sharpening section 24 is offset from "0x01" by "+0x01" to become "0x02". The degree of the high definition process carried out by the high definition processing section 25 is offset from "0x10" by "+0x01" to become "0x11".

With the configuration, in a case where the reproducing target program is a 3D image, the CPU 118 can set the degrees of the edge sharpening process and the high definition process to be greater than or equal the degrees set in the correction value table.

Therefore, even if the reproducing target program is a 3D image of the side-by-side method, the image processing circuit 107 can emphasize the degrees of the edge sharpening process and the high definition process, thereby more distinctly reproducing the sharpness and the fineness which are deteriorated by the noise reduction process and the gradation smoothing process. This enables the image processing circuit 107 to carry out appropriate image processing on the video signal of the reproducing target program which is a 3D image.

The foregoing description has discussed the television of each of the modification examples of the present embodiment by describing the configuration that the values set in the correction value table are offset by use of values set in any one of the aforementioned offset tables. However, the present invention is not limited to this configuration. For example, it is also possible to employ a configuration that values set in the correction value table are offset by use of values set in two or more of the aforementioned offset tables.

For example, values set in the correction value table may be offset by values set in each of the movie offset table and the user offset table mentioned above. Further, the values set in the correction value table may be offset by use of values set in each of the movie offset table, the user offset table, and the 3D offset table.

[Additional Matters]

In order to solve the problem above, a recording and reproducing device of the present invention includes (i) recording means for recording a broadcast content in a recording medium and (ii) reproducing means for reproducing the broadcast content recorded in the recording medium, said recording and reproducing device comprising: storing means for, when the recording means records a broadcast content in the recording medium, storing broadcast medium information indicative of a broadcast medium of the broadcast content and recording mode information indicative of a recording mode of the broadcast content in such a manner that the broadcast medium information and the recording mode information are related to the broadcast content; image processing means for carrying out an image process on the broadcast content before the reproducing means reproduces the broadcast content; and controlling means for controlling the image processing means, the controlling means automatically setting a degree of the image process carried out on the broadcast content by the image processing means in accordance with the broadcast medium information and the recording mode information which are stored in such a manner that the broadcast medium information and the recording mode information are related to the broadcast content.

A method for recording and reproducing of the present invention is a method for recording and reproducing performed by a recording and reproducing device, including the steps of (i) recording a broadcast content in a recording medium and (ii) reproducing the broadcast content recorded in the recording medium, said method comprising the steps of: (a) when the broadcast content is recorded in the step (i), storing broadcast medium information indicative of a broadcast medium of the broadcast content and recording mode information indicative of a recording mode of the broadcast content in such a manner that the broadcast medium information and the recording mode information are related to the broadcast content; (b) carrying out an image process on the broadcast content before the broadcast content is reproduced in the step (ii); and (c) automatically setting a degree of the image process carried out on the broadcast content in the step (b) in accordance with the broadcast medium information and the recording mode information which are stored in such a manner that the broadcast medium information and the recording mode information are related to the broadcast content.

With the configuration, the image processing means carries out the image process on the broadcast content in accordance with the degree of the image process which is set automatically according to the broadcast medium information and the recording mode information which are stored in such a manner that they are related to the broadcast content to be reproduced.

This enables the image processing means to carry out the most appropriate image process on the broadcast content according to the recording mode, and also carry out the most appropriate image process on the broadcast content according to the broadcast medium.

Examples of the recording mode include a mode for recording a broadcast content with original resolution, a mode for recording a broadcast content with one-fourth of the original resolution, and a mode for recording a broadcast content with one-eighth of the original resolution.

Examples of the broadcast medium include terrestrial digital broadcasting, BS broadcasting, CS broadcasting, CATV broadcasting, and IP broadcasting.

It is preferable to arrange the recording and reproducing device of the present invention such that the image processing means includes (1) smoothing means for carrying out a smoothing process on the broadcast content reproduced by the reproducing means and (2) edge sharpening/high definition means for carrying out an edge sharpening process or a high definition process on the broadcast content whose noise has been removed by the smoothing means, and for the reproduction of the broadcast content by the reproducing means, the controlling means specifies resolution of the broadcast content recorded in the recording medium by referring to the recording mode information, and sets both of a degree of the smoothing process and a degree of the edge sharpening process or the high definition process to be greater as the specified resolution is lower.

With the configuration, the image processing means subjects the broadcast content to the smoothing process by the smoothing means and the edge/sharpening process or the high definition process by the edge sharpening/high definition means in this order. In the smoothing process, noises contained in the broadcast content can be removed, however, there is likely to be a side effect that an outline of an image of the broadcast content blurs so that sharpness and fineness deteriorate. With the configuration, the edge sharpening process or the high definition process is carried out on the broadcast content with deteriorated sharpness and fineness, thereby preventing deterioration in sharpness and fineness.

The controlling means sets both of the degree of the smoothing process and the degree of the edge sharpening process or the high definition process to be greater as the resolution of the broadcast content specified by referring to the recording mode is lower. This makes it possible to remove more noises from a broadcast content recorded with lower resolution which generally contains more noises than a broadcast content recorded with higher resolution. Further, by carrying out a greater degree of the edge sharpening process or high definition process on a broadcast content having been subjected to the greater degree of the smoothing process, it is possible to prevent an image of the broadcast content from being blurred.

It is preferable to arrange the recording and reproducing device of the present invention such that the controlling means sets the degree of the smoothing process and the degree of the edge sharpening process or the high definition process with reference to a table in which the specified resolution is related to both of the degree of the smoothing process and the degree of the edge sharpening process or the high definition process with respect to each broadcast medium of the broadcast content.

With the configuration, the controlling means sets the degree of the smoothing process and the degree of the edge sharpening process or the high definition process with reference to the table recorded with respect to each broadcast medium according to the specified resolution. This enables the image processing means to carry out the most appropriate smoothing process and the most appropriate edge sharpening process or the high definition process on the broadcast content with respect to each broadcast medium.

It is preferable to arrange the recording and reproducing device of the present invention such that when the recording means records the broadcast content, the storing means further stores genre information indicative of a genre of the broadcast content in such a manner that the genre information is related to the broadcast content, and for the reproduction of the broadcast content by the reproducing means, the controlling means specifies the genre of the broadcast content recorded in the recording medium by referring to the genre information and, in a case where the specified genre is a movie, the controlling means sets the degree of the smoothing process to be not more than a degree recorded in the table and sets the degree of the edge sharpening process or the high definition process to be not less than a degree recorded in the table.

With the configuration, in a case where the genre of a broadcast content to be reproduced is a movie, the controlling means sets the degree of the smoothing process and the degree of the edge sharpening process or the high definition process which are recorded in the table to be not more than the degrees recorded in the table, and sets the degree of the edge sharpening process or the high definition process to be not less than the degree recorded in the table.

With the configuration, by setting the degree of the smoothing process to be not more than the degree recorded in the table, it is possible to prevent grain noises unique to a broadcast content which is a movie from being removed more than necessary in the smoothing means. Further, by setting the degree of the edge sharpening process or the high definition process to be not less than the degree recorded in the table, it is possible to emphasize the grain noises removed in the smoothing process. This enables the grain noises to be reproduced.

It is preferable to arrange the recording and reproducing device of the present invention such that when the recording means records the broadcast content, the storing means further stores user information indicative of a user who gave an instruction of recording the broadcast content by the recording means in such a manner that the user information is related to the broadcast content, and for the reproduction of the broadcast content by the reproducing means, the controlling means sets the degree of the smoothing process and the degree of the edge sharpening process or the high definition process by referring to the table and adjusting values respectively for the degree of the smoothing process and the degree of the edge sharpening process or the high definition process, the adjusting values being set in advance by a user indicated by the user information related to the broadcast content.

With the configuration, the controlling means sets the degree of the image process to be in accordance with the preference of a user who gives an instruction of recording the broadcast content. This enables the reproducing means to carry out, on the broadcasting content reproduced by the reproducing means, the image process in accordance with the preference of a user who gives an instruction of recording the broadcast content.

It is preferable to arrange the recording and reproducing device of the present invention such that in a case where the broadcast content reproduced by the reproducing means is a 3-dimensional image, the controlling means sets the degree of the edge sharpening process or the high definition process to be not less than the degree recorded in the table.

With the configuration, the controlling means can set the degree of the image process appropriate for the broadcast content which is a 3-dimensional image. Therefore, the reproducing means can carry out a more appropriate image process on the broadcast content which is a 3-dimensioal image.

Note that, the television receiver including the recording and reproducing device is also encompassed in the present invention.

The present invention also encompasses a program for operating a computer as a recording and reproducing device of the present invention, which program causes the computer as each of the means of the recording and reproducing device, and a computer-readable recording medium in which the program is recorded.

(Program and Recording Medium)

Each block of the television 1 can be hardware-like by a logic circuit formed on a micro circuit (IC chip) and also achieved to be software-like by CPU (Central Processing Unit).

In the latter case, the television 1 is provided with a CPU for executing commands of programs to realize each function, a ROM (Read Only Memory) storing the programs, a RAM (Random Access Memory) expanding the programs, a recording device (a recording medium) such as a memory et al., for storing the programs and various data, or the like. The objection of the present invention can be also achieved by providing the television 1 with a recording medium in which a program code (an execution form, an intermediate code program, and source program) of a control program of the television 1 which is a software for realizing the functions, is recorded so that the program code can be read out and by reading out and executing the program code recorded in the recording medium by a computer (or a CPU and a MPU).

Examples of the recording mediums are tapes such as an electromagnetic tape and a cassette tape, discs including magnetic discs such as a floppy (registered trademark) disc/a hard disc and optical discs such as a CD-ROM/MO/MD/DVD/CD-R, cards such as an IC card (including a memory card)/an optical card, semiconductor memory cards such as a mask ROM/EPROM/EEPROM/flash ROM, or logic circuits such as PLD (Programmable logic device) and FPGA (Field Programmable Gate Array), and the like.

The program code can be transmitted to the television 1 via telecommunication network. This telecommunication network is not specially limited, as long as a program code can be transmitted. For example, internet, intranet, extranet, LAN, ISDN, VAN, CATV telecommunication network, VPN (Virtual Private Network), telephone network, mobile communication network, satellite communication network, and the like can be used. A transmission medium constituting this telecommunication network is also not limited to a certain configuration or type, as long as a program code can be transmitted. For example, a transmission medium can be a wired circuit such as IEEE1394, USB, power-line carrier, cable TV line, telephone line, ADSL line, and the like, infrared lay such as IrDA and remote control, wireless circuit such as Blue tooth (registered trademark), IEEE80211 wireless, HDR (High Data Rate), NFC (Near Field Communication), DLNA (Digital Living Network Alliance), mobile phone network, satellite connection, terrestrial digital network, and the like. Note that, it should be considered such that embodiments disclosed here are examples and not limitative in all points. The scope of the present invention is not encompassed by the description above but by claims, and intends to include claims, equivalents and every alteration within the scope.

INDUSTRIAL APPLICABILITY

The present invention is applicable to a recording and reproducing device in general for recording and reproducing a broadcast program. A television having a recording and reproducing function is an example of the recording and reproducing device. For example, the present invention is suitably applicable to a personal computer, a mobile phone, and the like.

REFERENCE SIGNS LIST

1 Television (Recording and Reproducing Device)
2 USB-HD Drive
3 USB Cable
11 Scaling Processing Section
12 Coding Section
13 Decoding Section
21 Scaling Processing Section
22 Noise Removing Section (Smoothing Means)
23 Gradation Smoothing Section (Smoothing Mean s)
24 Edge Sharpening Section (Edge Sharpening/High Definition Means)
25 High Definition Processing Section (Edge Sharpening/High Definition Means)
101 External Input Terminal
102 Terrestrial Digital Broadcasting Tuner
103 Satellite Broadcasting Tuner
104 Recording and Reproducing Section
104a Recording Section (Recording Means)
104b Reproducing Section (Reproducing Means)
105 BD Drive
106 Video Selector
107 Image Processing Circuit (Image Processing Means)
108 OSD Generating Section
109 LCD Controller
110 LCD
111 Audio Selector
112 Audio Processing Circuit
113 Amplifier
114 Speaker
115 USB Interface
116 ROM
117 RAM
118 CPU (Storing Means and Controlling Means)
119 Infrared Ray Receiving Section
120 Camera
121 HD Drive

The invention claimed is:

1. A reproducing device for reproducing a broadcast content recorded in a recording medium, wherein
the recording medium stores (i) broadcast medium information indicative of a broadcast medium of a broadcast content and (ii) recording mode information indicative of a recording mode of the broadcast content in such a manner that the broadcast medium information and the recording mode information are related to the broadcast content,
said reproducing device comprising:
image processing means for carrying out an image process on the broadcast content before the broadcast content is reproduced; and
controlling means for controlling the image processing means, the controlling means automatically setting a degree of the image process carried out on the broadcast content by the image processing means, the controlling means setting the degree of the image process in accordance with the broadcast medium information and the recording mode information stored in such a manner that the broadcast medium information and the recording mode information are related to the broadcast content,
the control means setting the degree of the image process to be greater as a resolution specified by the recording mode information is lower, and
the image process including at least one of a noise reduction process, a gradation smoothing process, an edge sharpening process, and a high definition process,
the recording medium storing user information indicative of a user who gave an instruction of recording the broadcast content in such a manner that the user information is related to the broadcast content, and
the controlling means adjusting the degree of the image process also in accordance with the user information.

2. The reproducing device as set forth in claim 1, wherein:
the recording medium stores genre information indicative of a genre of the broadcast content in such a manner that the genre information is related to the broadcast content; and
the controlling means further adjusts the degree of the image process in accordance with the genre information.

3. The reproducing device as set forth in claim 1, wherein the broadcast medium information includes at least any one of terrestrial digital broadcasting, BS broadcasting, CS broadcasting, CATV broadcasting, IP broadcasting, and H. 264 broadcasting.

4. The reproducing device as set forth in claim 1, wherein:
the image processing means includes:
smoothing means for carrying out the smoothing process on the broadcast content to be reproduced; and
edge sharpening/high definition means for carrying out the edge sharpening process or the high definition process on the broadcast content whose noise has been removed by the smoothing means,
for the reproduction of the broadcast content, the controlling means specifies resolution of the broadcast content recorded in the recording medium by referring to the recording mode information, and sets both of a degree of the smoothing process and a degree of the edge sharpening process or the high definition process to be greater as the specified resolution is lower.

5. The reproducing device as set forth in claim 4, wherein the controlling means sets the degree of the smoothing process and a degree of the edge sharpening process or the high definition process with reference to a table recording in which the specified resolution is related to both of the degree of the smoothing process and the degree of the edge sharpening process or the high definition process with respect to each broadcast medium of the broadcast content.

6. The reproducing device as set forth in claim 5 further comprising:
storing means for storing the user information indicative of a user who gave an instruction of recording the broadcast content by the recording means, the storing means for storing the user information in such a manner that the user information is related to the broadcast content when the recording means records the broadcast content,
for the reproduction of the broadcast content by the reproducing means, the controlling means sets the degree of the smoothing process and the degree of the edge sharpening process or the high definition process by referring to the table and adjusting values respectively for the degree of the smoothing process and the degree of the edge sharpening process or the high definition process, the adjusting values being set in advance by the user indicated by the user information related to the broadcast content.

7. The reproducing device as set forth in claim 5, wherein in a case where the broadcast content reproduced by the reproducing means is a 3-dimensional image, the controlling means sets the degree of the edge sharpening process or the high definition process to be not less than the degree recorded in the table.

8. The reproducing device as set forth in claim 1, wherein the recording medium is built in the reproducing device.

9. A display device comprising:
a reproducing device as set forth in claim 1.

10. A recording and reproducing device including (i) a reproducing device recited in claim 1, (ii) recording means for recording a broadcast content in the recording medium and (iii) reproducing means for reproducing the broadcast content recorded in the recording medium, said recording and reproducing device comprising storing means for, when the broadcast content is recorded, storing broadcast medium information indicative of the broadcast medium of the broadcast content and recording mode information indicative of the recording mode of the broadcast content in such a manner that the broadcast medium information and the recording mode information are related to the broadcast content, the image processing means carrying out, before the recording means reproduces the broadcast content, the image process on the broadcast content, the controlling means automatically setting the degree of the image process carried out on the broadcast content by the image processing means, in accordance with the broadcast medium information and the recording mode information which are stored in such a manner that the broadcast medium information and the recording mode information are related to the broadcast content, the controlling means setting the degree of the image process to be greater as a resolution specified by the recording mode information is lower, and the image process including at least one of a noise reduction process, a gradation smoothing process, an edge sharpening process, and a high definition process.

11. A television receiver including (i) a reproducing device recited in claim 1.

12. A method for reproducing, by a reproducing device, a broadcast content recorded in a recording medium, said recording medium storing (i) the broadcast medium information indicative of a broadcast medium of a broadcast content and (ii) recording mode information indicative of a recording mode of the broadcast content in such a manner that the broadcast medium information and the recording mode information are related to the broadcast content, said method for reproducing comprising the steps of:

(a) carrying out an image process on the broadcast content before the broadcast content is reproduced; and (b) automatically setting a degree of the image process carried out on the broadcast content in the step (a) in accordance with the broadcast medium information and the recording mode information which are stored in such a manner that the broadcast medium information and the recording mode information are related to the broadcast content, in step (b), the degree of the image process being set to be greater as a resolution specified by the recording mode information is lower, the image process including at least one of a noise reduction process, a gradation smoothing process, an edge sharpening process, and a high definition process, the recording medium storing user information indicative of a user who gave an instruction of recording the broadcast content in such a manner that the user information is related to the broadcast content, and in the step (b), the degree of the image process being adjusted also in accordance with the user information.

13. A non-transitory computer-readable recording medium in which a program for operating a computer as a reproducing device as set forth in claim 1 is recorded, the program causing the computer to function as each of the means of the reproducing device or the recording and reproducing device.

* * * * *